United States Patent [19]
Cline et al.

[11] Patent Number: 5,721,851
[45] Date of Patent: Feb. 24, 1998

[54] TRANSIENT LINK INDICATORS IN IMAGE MAPS

[75] Inventors: Troy Lee Cline, Cedar Park; Scott Harlan Isensee, Georgetown; Ricky Lee Poston, Austin, all of Tex.

[73] Assignee: International Business Machines Corporation, Armonk, N.Y.

[21] Appl. No.: 509,478

[22] Filed: Jul. 31, 1995

[51] Int. Cl.⁶ .................................................. G06F 3/00
[52] U.S. Cl. .................................................. 395/349
[58] Field of Search ........................ 395/155, 159, 395/333, 334, 335, 339, 349

[56] References Cited

U.S. PATENT DOCUMENTS

| | | | |
|---|---|---|---|
| 5,050,105 | 9/1991 | Peters | 364/521 |
| 5,212,733 | 5/1993 | DeVitt et al. | 381/119 |
| 5,243,697 | 9/1993 | Hoeber et al. | 395/156 |
| 5,261,044 | 11/1993 | Dev et al. | |
| 5,339,392 | 8/1994 | Risberg et al. | |
| 5,392,395 | 2/1995 | Fujii et al. | |
| 5,408,600 | 4/1995 | Garfinkel et al. | |
| 5,479,355 | 12/1995 | Hyduke | 364/488 |

OTHER PUBLICATIONS

Cowart, R., "Mastering Windows 3.1," 1992, pp. 14–15, Cybex.

Wilson, B.C., "Being There", Window Sources, V.3, n. 10, p. 198(1) Oct. 1995.

Primary Examiner—Mark R. Powell
Assistant Examiner—A. Katbab
Attorney, Agent, or Firm—Diana L. Roberts; Richard A. Henkler; Andrew J. Dillon

[57] ABSTRACT

A uniquely programmed computer system, computer-implemented method, and computer readable memory embodying computer-readable detailed logic (i.e., computer readable program code) direct a computer system to display an image map having graphical objects thereon and an original appearance. At least a first portion of the graphical objects are links to other documents. The method includes the step of changing the original appearance of the first portion of the graphical objects to indicate that those graphical objects are links. This step is performed in response to user controls (e.g., a user positioning a mouse cursor) positioned on the image map.

11 Claims, 4 Drawing Sheets

TRANSIENT LINK INDICATORS IN IMAGE MAPS

BACKGROUND OF THE INVENTION

1. Field of the Invention

The present invention relates to improvements in user interfaces and, more particularly, but without limitation, to improvements in browsers using image maps having transient link indicators.

2. Background Information and Description of the Related Art

A user typically communicates with the Internet using a browser or "graphical user interface" (GUI). Conventional Internet browsers utilize special images, called image maps, to link a first Internet document to a second. Image maps my be in the form of a icon-like pictures having various special active areas therein. If the user positions and clicks a pointing device over an active area of the image map, the Internet browser displays the second document linked to the first document.

However, conventional Internet browsers suffer certain disadvantages and limitations. First, the user frequently has no indication if a picture is indeed an image map. Second, the user has no indication as to which part of the picture, if any, is an active area (i.e., click target). Third, conventional Internet browsers provide no indication as to whether a picture has any particular click targets and, if so, where they are within the picture.

Therefore, it would be extremely advantages for a browser to create image maps having "transient link indicators." Such indicators should clearly indicate to a user if a picture is an image map and, if so, where active areas are located in the image map.

SUMMARY

Accordingly, a uniquely programmed computer system, computer-implemented method, and computer readable memory embodying computer-readable detailed logic direct a computer system to display an image map having graphical objects thereon and an original appearance. At least a first portion of the graphical objects are links to other documents. The method includes the step of changing the original appearance of the first portion of the graphical objects to indicate that those graphical objects are links. This step is performed in response to user controls (e.g., a mouse cursor) being positioned on the image map.

Therefore, it is an object of the present invention to provide a UI (e.g., browser) that provides a temporary visual indication as to whether a picture is an image map.

It is a further object to provide a UI that provides a visual indication as to where active areas (i.e., links) are located within an image map.

These and other objects, advantages, and features will become even more apparent in light of the following drawings and detailed description.

DETAILED DESCRIPTION OF THE PREFERRED EMBODIMENT

The preferred embodiment includes a computer-implemented method, a uniquely programmed computer system, and a memory embodying detailed logic for directing a computer system to create an image map having transient link indicators in a user interface.

Figure 1:
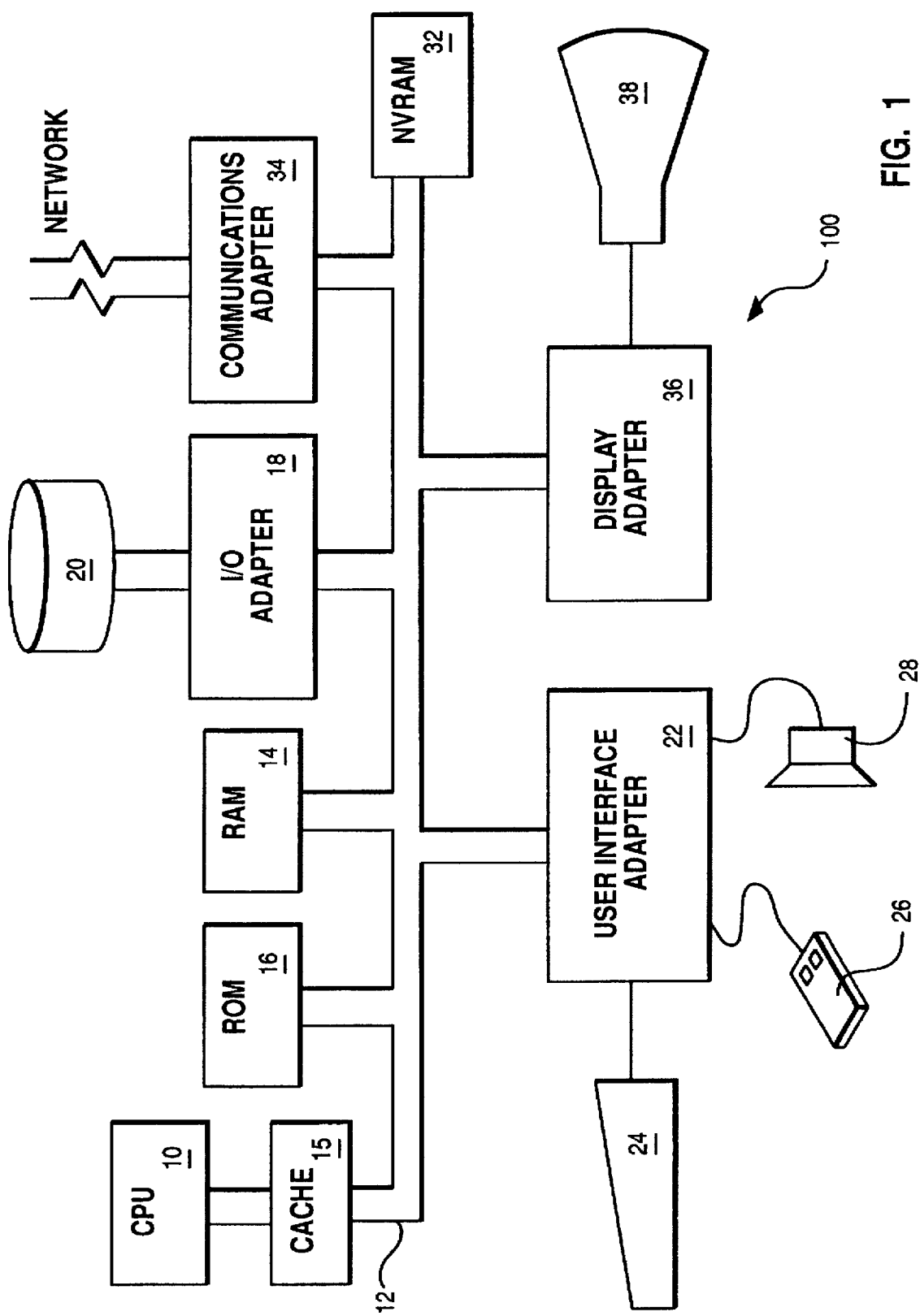
FIG. 1 illustrates a schematic diagram of a computer system for use with the present invention.

The preferred embodiment is practiced in a laptop computer or, alternatively, in the computer system illustrated in FIG. 1. Computer system 100 includes central processing unit (CPU) 10, such as an IBM's™ PowerPC™ 601 or Intel's™ 486 microprocessor for processing cache 15, random access memory (RAM) 14, read only memory 16, and non-volatile RAM (NVRAM) 32. One or more disks 20, controlled by I/O adapter 18, provide long term storage. A variety of other storage media may be employed, including tapes, CD-ROM, and WORM drives. Removable storage media my also be provided to store data or computer process instructions.

Instructions and data from the desktop of any suitable operating system, such as Sun Solaris™, Microsoft's Windows NT™, or Apple's System 7™, control CPU 10 from RAM 14. Accordingly, the desktop executes from RAM 14. However, in the preferred embodiment, an IBM RISC System/6000™ runs the AIX™ operating system. As previously described, however, one skilled in the art readily recognizes that other hardware platforms, operating systems, and applications may be utilized to implement the present invention.

Users communicate with computer system 100 through I/O devices (i.e., user controls) controlled by user interface adapter 22. Display 38 displays information to the user, while keyboard 24, pointing device 26, and speaker 28 allow the user to direct the computer system. Alternatively, additional types of user controls may be employed, such as a joy stick, touch screen, or virtual reality headset (not shown). Communications adapter 34 controls communications between this computer system and other processing units connected to a network by network interface 40. Display adapter 36 controls communications between this computer system and display 38.

Figure 2:
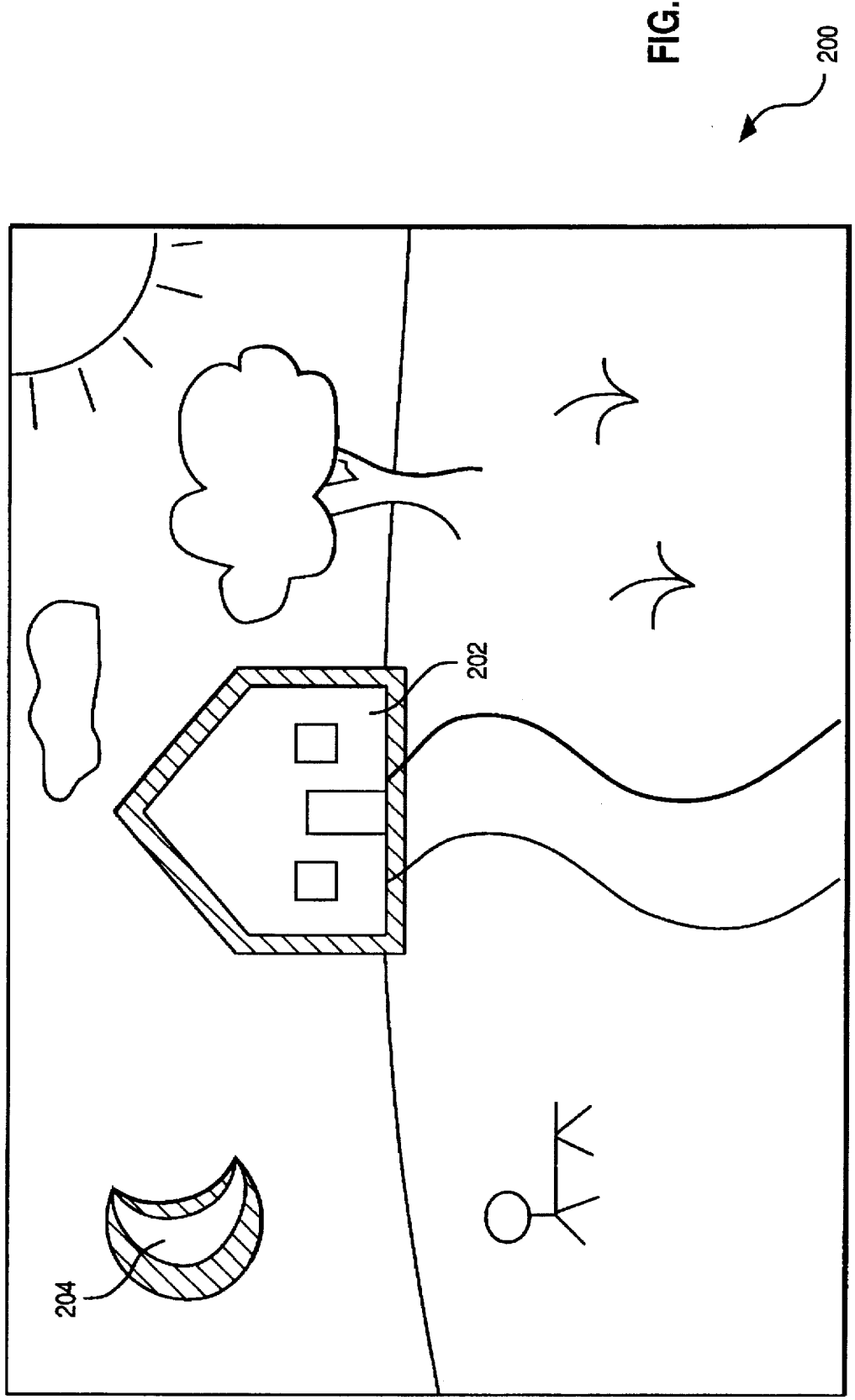
FIG. 2 illustrates a frontal display diagram of an image map in accordance with the present invention.

Referring to FIG. 2, the preferred embodiment includes an enhanced user interface (UI) of a web browser client for displaying image map 200 on display 38. Image map 200 is enlarged to show detail. For ease and explanation, the following description describes the web browser client UI as performing unique functions and features. In actuality, the web browser client UI merely directs CPU 10 to perform those functions and features.

Image map 200 is an icon or picture found within, for example, an Internet browser. Image map 200 displays graphical objects 202, 204, and an assortment of other graphical objects (e.g. icons). An image map configuration file (not shown) contains information regarding which graphical objects are active or inactive areas. For example, the UI may have pixel locations for the doors and windows of graphical object (e.g., icon) 202 separately recorded as active areas.

The user utilizes pointing device 26 or, alternatively, any appropriate user controls, to determine if image map 200 is indeed an image map and to activate any active graphical objects. In this example, the user has positioned a pointing device over image map 200. In response, the UI creates a three-dimensional view of any active areas, which in this case are graphical objects 202 and 204. At this point, the user now knows that selecting one of these graphical objects will link him to another document. For example, clicking on object 204 may link him to a document on astronomy. Using a pointing device is well known in the computer art and need not be further described.

Figure 3:
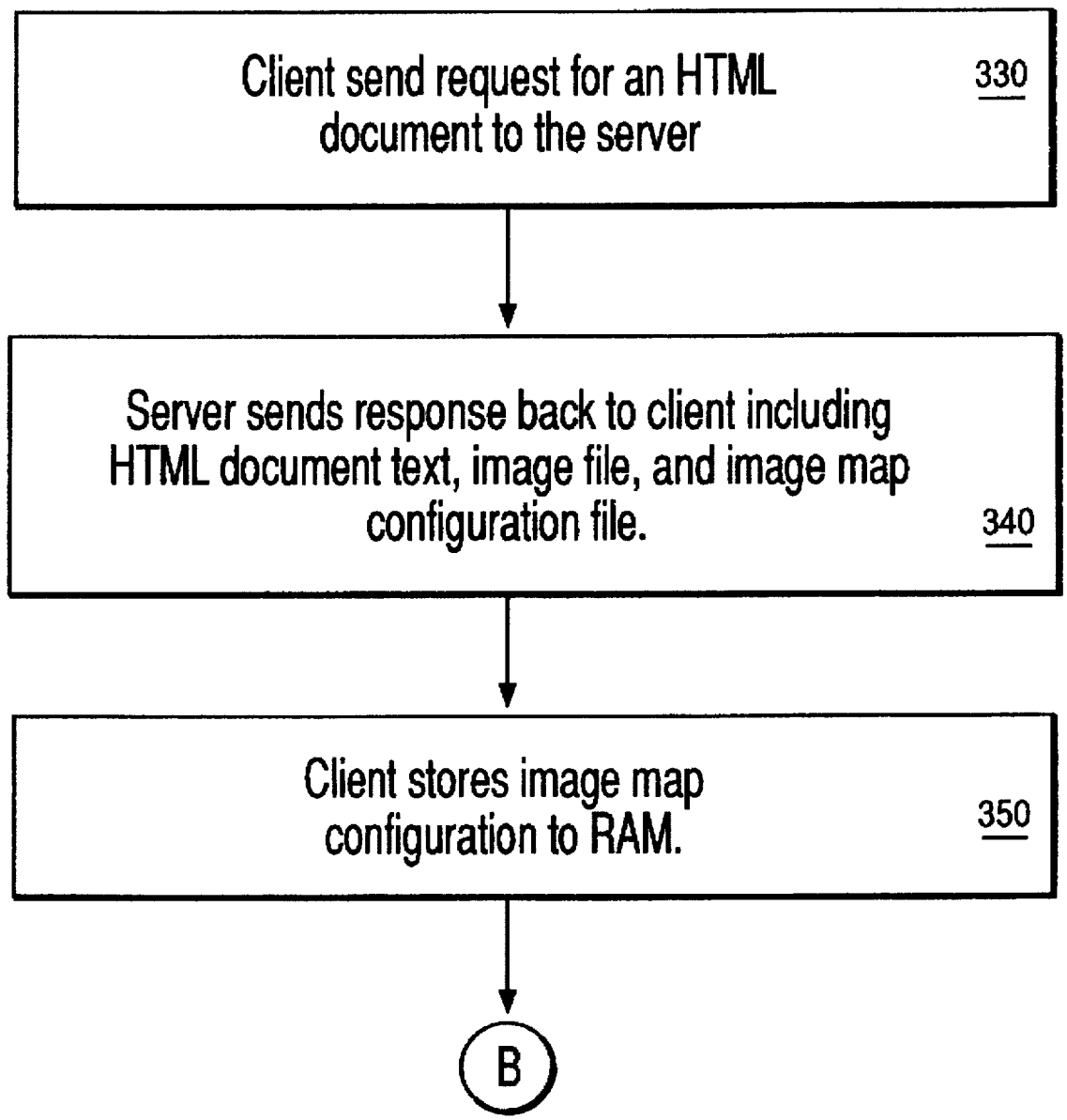
FIGS. 3 and 4 illustrate a flowchart of detailed logic for activating the image map in accordance with the present invention.
Figure 4:
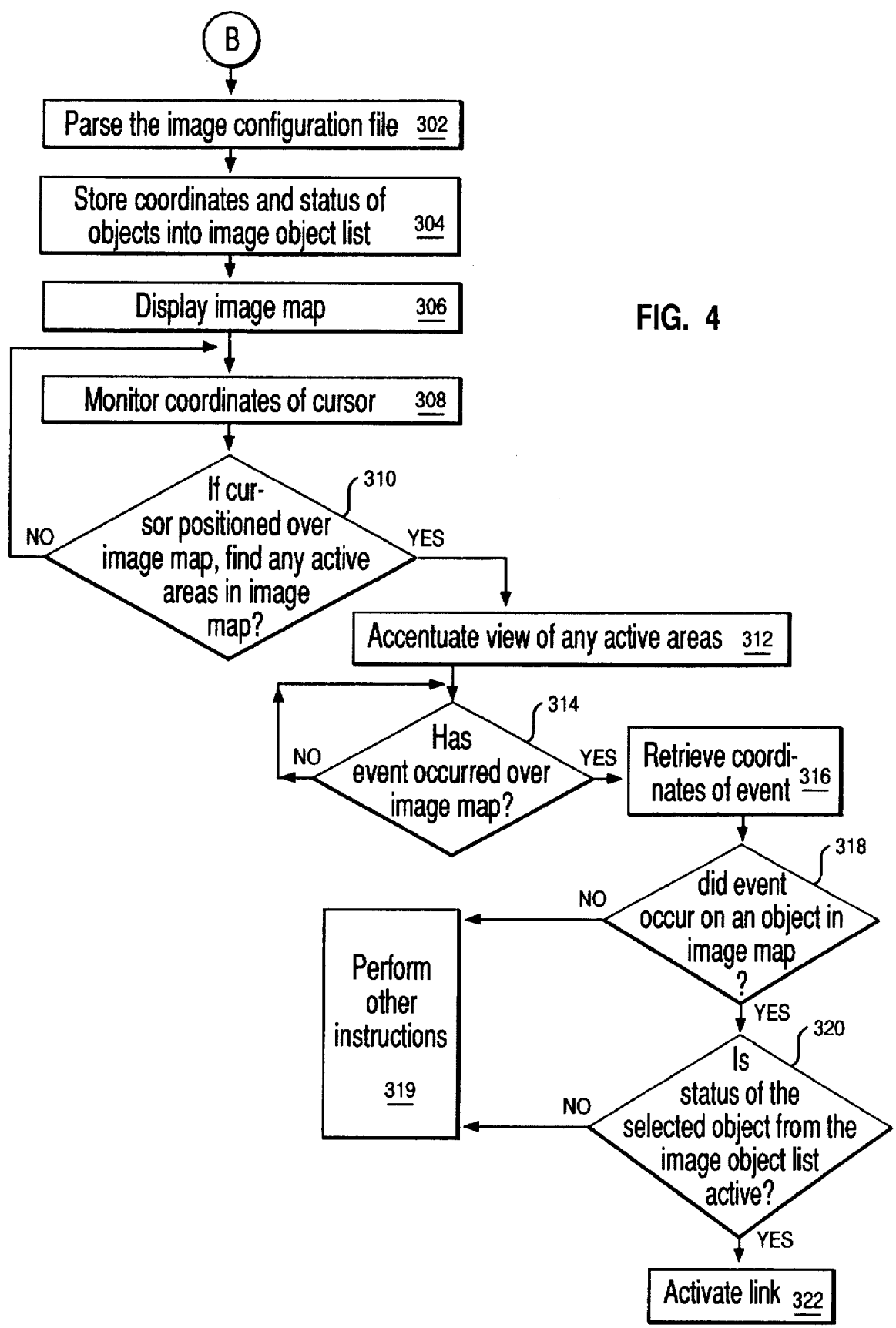

The flow of execution of the preferred embodiment is as follows:

FIG. 3 illustrates a flowchart of-detailed logic in accordance with the present invention. At 330, the client sends a request to the server to read a HTML document that contains an image map. Within the request headers that the client sends to the server will be information indicating that the client supports image map configuration files. At 340, the server responds to the request by sending response headers that describe the information being sent back to the client including the HTML document, the image map image file, and the image map configuration file. At 350, the client stores the image map configuration file within RAM 14. Continuing at FIG. 4, at 302, the client parses the image map configuration file. The image map configuration file contains the default arrangement and descriptive information of the graphical objects present in image map 200. Descriptive information includes the name of the object, the dimensions of the image (e.g., icon) representing the object, the location of the object within image map 200, whether the object or part of the object is an active area (and, therefore, a link), and if the object is an active area, the commands necessary to activate the link. Several conventional desktops utilize configuration files and, therefore, they are well known in the computer arts. The client parses the configuration file into system-recognizable data.

At 304, the UI stores the dimensions/screen coordinates and active/inactive status of each graphical object into an image object list in the UI and, at 306, displays image map 200 to the screen. At 308, the UI monitors the coordinates of the mouse cursor. At 310, if the user moves the mouse cursor over image map 200, the UI examines the image object list to determine if any of the objects in image map 200 are active areas. If so, at 312, the UI creates a three-dimensional view of the active areas, thereby giving the active area a button-like look and feel. Alternatively, the UI may dim all inactive areas. The UI continues to monitor the position of the mouse cursor. Should the user move the mouse cursor off image map 200, the UI returns image map 200 to its original appearance.

At 314, if the mouse cursor is still over image map 200, the UI waits for an event to occur over image map 200 (e.g., click over active area). If detected, at 316, the UI retrieves the X, Y coordinates of the event from a queue (not shown). At 318, the UI determines if the X, Y coordinates are within any graphical object dimensions retrieved from the image object list (i.e., did the user click on a valid graphical object). If not within the dimensions, the WI continues to monitor events_. If within the dimensions, at 320, the UI examines the status of the selected graphical object from the image object list to determine if it is an active area. If an active area, at 322, the UI activates the link. In not an active area, at 324, the UI ignores the event.

The following code illustrates the above process:

```
client sends request for an HTML document to the
    server;
server sends response back to client including HTML
    document text, image file, and image map
    configuration file;
Client stores image map configuration file to RAM
```

```
parse image map configuration file;
store dimensions, name, status and commands for each
    graphical object in image object list;
display image map to screen;
WHILE monitoring cursor;
    WHILE cursor positioned over image map;
        examine image object list and accentuate
            view of any active areas in image
            map;
        IF any click is made over image map, THEN;
            get x,y value of click;
            compare x,y value with graphical
                object dimensions stored in
                image object list;
        END IF;
        IF x,y value within graphical object
        dimensions THEN;
            IF active status is TRUE THEN;
                activate link;
            ELSE perform other instructions;
        END IF;
    END WHILE;
END WHILE;
```

While the invention has been shown and described with reference to particular embodiments thereof, it will be understood by those skilled in the art that the foregoing and other changes in form and detail may be made therein without departing from the spirit and scope of the invention, which is defined only by the following claims.

What is claimed is:

1. A computer-implemented method for directing a computer system to display an image map having graphical objects thereon and an original appearance, wherein at least a first portion of the graphical objects are active areas serving as links to a specified document, comprising the step of:

in response to user controls being positioned on the image map, changing the original appearance of the at least first portion of the graphical objects to indicate that the first portion are links.

2. The method according to claim 1 further comprising the step of returning the at least first portion of the graphical objects back to the original appearance in response to the user controls not being positioned on the image map.

3. The method according to claim 1 wherein the step of changing the original appearance comprises the step of shading the edges of the first portion of the graphical objects such that they appear as three-dimensional buttons.

4. The method according to claim 1 further comprising the steps of:

in response to the user controls being positioned on the image map, reading an image configuration file containing a status, dimensions, and a name for each graphical object in the image map; and changing the appearance of the graphical objects in the image map having the status of ACTIVE, wherein all of the ACTIVE graphical objects form the first portion.

5. The method according to claim 4 further comprising the steps of:

retrieving an x,y value when a click by the user controls has been made on the image map;

if the x,y value is within one of the dimensions from the image configuration file, determining if the status of the selected graphical object corresponding to the dimensions is ACTIVE; and if the status is ACTIVE, activating a link associated with the selected graphical object.

6. An article of manufacture comprising:
a computer usable medium having computer readable program code means embodied therein for directing a computer to display an image map having graphical objects thereon and an original appearance, wherein at least a first portion of the graphical objects are active areas serving as links to a specified document, the computer readable program code means in the article of manufacture comprising:
    computer readable program code means for causing the computer to change the original appearance of the at least first portion of the graphical objects to indicate that the first portion are links in response to user controls being positioned on the image map.

7. A computer system for displaying an image map having graphical objects thereon and an original appearance, wherein at least a first portion of the graphical objects are active areas serving as links to a specified document, comprising:
    in response to user controls being positioned on the image map, means for changing the original appearance of the at least first portion of the graphical objects to indicate that the first portion are links.

8. The system according to claim 7 further comprising means for returning the at least first portion of the graphical objects back to the original appearance in response to the user controls not being positioned on the image map.

9. The system according to claim 7 wherein the means for changing the original appearance comprises means for shading the edges of the first portion of the graphical objects such that they appear as three-dimensional buttons.

10. The system according to claim 7 further comprising:
    in response to the user controls residing on the image map, means for reading an image configuration file containing a status, dimensions, and a name for each graphical object in the image map; and
    means for changing the appearance of the graphical objects in the image map having the status of ACTIVE, wherein all of the ACTIVE graphical objects form the first portion.

11. The system according to claim 10 further comprising:
    means for retrieving an x,y value from a queue when a click by the user controls has been made on the image map displayed on a display;
    if the x,y value is within one of the dimensions from the image configuration file, means for determining if the status of the selected graphical object corresponding to the dimensions is ACTIVE; and
    if the status is ACTIVE, means for activating a link associated with the selected graphical object.

* * * * *